(12) United States Patent
Feigenblum

(10) Patent No.: US 12,011,891 B2
(45) Date of Patent: Jun. 18, 2024

(54) METHOD AND TOOL FOR MANUFACTURING A QUADRANGULAR SHELL MADE OF COMPOSITE MATERIAL

(71) Applicant: ROCTOOL, Le Bourget du Lac (FR)

(72) Inventor: José Feigenblum, Saint Paul (FR)

(73) Assignee: ROCTOOL, Le Bourget du Lac (FR)

( * ) Notice: Subject to any disclaimer, the term of this patent is extended or adjusted under 35 U.S.C. 154(b) by 154 days.

(21) Appl. No.: 17/785,844

(22) PCT Filed: Dec. 21, 2020

(86) PCT No.: PCT/EP2020/087548
§ 371 (c)(1),
(2) Date: Jun. 15, 2022

(87) PCT Pub. No.: WO2021/123456
PCT Pub. Date: Jun. 24, 2021

(65) Prior Publication Data
US 2023/0062340 A1    Mar. 2, 2023

(30) Foreign Application Priority Data

Dec. 21, 2019  (FR) ...................................... 1915386

(51) Int. Cl.
*B29C 70/86* (2006.01)
*A45C 5/03* (2006.01)
(Continued)

(52) U.S. Cl.
CPC ................ *B29C 70/86* (2013.01); *A45C 5/03* (2013.01); *A45C 5/14* (2013.01); *A45C 13/262* (2013.01);
(Continued)

(58) Field of Classification Search
CPC ....... B29C 70/86; B29C 70/345; B29C 70/44; C08J 5/243; A45C 2005/037; B29B 11/08
(Continued)

(56) References Cited

U.S. PATENT DOCUMENTS 2,410,681 A * 11/1946 Rayburn ................ B65D 25/14
524/68
3,446,686 A * 5/1969 Butler ................... B29C 51/145
156/224
(Continued)

FOREIGN PATENT DOCUMENTS

EP   1238785 A1 * 9/2002 ............... A45C 5/02
EP   2694277 B1   6/2016
(Continued)

*Primary Examiner* — Don M Anderson
*Assistant Examiner* — Justin Caudill
(74) *Attorney, Agent, or Firm* — PATLOCK LLC; Jean C Hamann

(57) ABSTRACT

A method for manufacturing a quadrangular shell having five faces and non-developable trihedral connectors between the faces. Plies having continuous fibers are cut to cover the five faces of the shell outside of the trihedral connector zones. Four connector components consolidated in the shape of the trihedral connectors are obtained. Each of the components includes an integration zone between the plies. Plies are positioned and laid up. The four consolidated components are inserted in the trihedral connection zones by inserting the integration zones between two plies to form an assembly obtain a preform. The preform is placed in a tool and the consolidation of the stack of fibrous plies is performed by subjecting the assembly to a predetermined pressure/temperature cycle.

10 Claims, 4 Drawing Sheets

(51) Int. Cl.
*A45C 5/14* (2006.01)
*A45C 13/26* (2006.01)
*A45C 13/36* (2006.01)
*B29B 11/08* (2006.01)
*B29C 70/34* (2006.01)
*B29K 701/12* (2006.01)
*B29L 31/00* (2006.01)
*C08J 5/24* (2006.01)

(52) U.S. Cl.
CPC .............. *A45C 13/36* (2013.01); *B29B 11/08* (2013.01); *B29C 70/345* (2013.01); *C08J 5/243* (2021.05); *A45C 2005/037* (2013.01); *A45C 2013/267* (2013.01); *B29K 2701/12* (2013.01); *B29L 2031/7418* (2013.01)

(58) Field of Classification Search
USPC .......................................... 156/224, 52, 252

See application file for complete search history.

(56) References Cited

U.S. PATENT DOCUMENTS

| | | | | |
|---|---|---|---|---|
| 4,061,817 | A | * | 12/1977 | Maxel ...................... A45C 5/02 442/268 |
| 4,201,612 | A | * | 5/1980 | Figge ....................... B32B 7/04 156/221 |
| 4,997,615 | A | * | 3/1991 | Cattanach ............... B29C 70/44 264/510 |
| 5,132,166 | A | * | 7/1992 | Adams ..................... A45C 5/02 190/125 |
| 10,278,462 | B2 | * | 5/2019 | Vandevelde .......... B29C 70/465 |
| 2011/0057357 | A1 | * | 3/2011 | Feigenblum ............ B29C 43/52 425/174.8 R |
| 2011/0272852 | A1 | * | 11/2011 | Blot ....................... B29C 33/48 425/150 |
| 2016/0338458 | A1 | * | 11/2016 | Negrini ................... A45C 5/02 |
| 2019/0059535 | A1 | * | 2/2019 | Vannier ................ A45C 13/005 |

FOREIGN PATENT DOCUMENTS

| | | |
|---|---|---|
| EP | 3096643 A1 | 11/2016 |
| JP | H06190849 A * | 7/1994 |
| WO | 2017140982 A1 | 8/2017 |
| WO | 2017153965 A1 | 9/2017 |
| WO | WO-2019227409 A1 * | 12/2019 |

* cited by examiner

METHOD AND TOOL FOR MANUFACTURING A QUADRANGULAR SHELL MADE OF COMPOSITE MATERIAL

RELATED APPLICATIONS

This application is a § 371 application of PCT/EP2020/087548 filed Dec. 21, 2020, which claims priority from French Patent Application No. 1915386 filed Dec. 21, 2019, each of which is incorporated herein by reference in its entirety.

TECHNICAL FIELD

The invention relates to a method and a tool for producing of a quadrangular shell made of composite material.

The invention applies mainly, but not exclusively, to the field of luggage, for the production of a suitcase or a trunk with a rigid shell.

BACKGROUND OF THE INVENTION

In reference to FIG. 1 relative to the prior art, a suitcase or a rigid trunk generally comprises two quadrangular shells (100 only one of these shells is shown in this figure) of equivalent or different depths, comprising 5 faces, assembled by a hinge and closure mechanism.

Each shell includes a bottom (101) and flanged edges (102).

According to exemplary embodiments, said shells made of a thermoplastic polymer, reinforced or not, with fibers, short or continuous, according to the embodiment.

A so-called continuous fiber (110) extends from one free edge (191) to another free edge (192) of the shell. This definition of a continuous reinforcement is retained throughout the text.

When the shell is made of a composite reinforced by continuous fibers, the latter is obtained, for example, by laying up fibrous plies pre-impregnated with the polymer making the matrix, which during a later step, is shaped and consolidated in shape by a method of thermocompression.

Document EP 2 694 277 describes an example of such a method for shaping a fibrous plies layup by thermocompression.

The coupling zones (121, 122) between the faces of the shell, particularly the trihedral coupling zones (121) or "trunk corners", are critical zones in the implementation of this method, particularly when the reinforcing fibers used have little or no plasticity at the shaping temperature, or when their rigidity prevents them from following this complex contour.

The trihedral couplings (121) generally describe a surface in the portion of a sphere or in the portion of an ellipsoid.

First of all, it is difficult to get these shapes to match, particularly regarding the trunk corners (121) which are non-developable zones, without creating wrinkles in the plies.

It is difficult to apply a pressure in these zones without using a punch with mobilities or comprising inflatable portions, therefore a complex tool.

It is difficult to ensure a uniform heating temperature in these zones by implementing a fast heating and cooling tool, such as described in document EP 2 694 277.

Even when succeeding in avoiding wrinkling, for example by tensioning the fibers during the shaping, by succeeding in providing a uniform heating and sufficient pressure for the consolidation in said zones, wringing phenomena of the polymer between the fibers may occur, leading to localized deficiencies of the polymer matrix and the appearance of defects.

Thus, although the device and the method described in EP 2 694 277, are generally satisfactory for the manufacture of shells having a shallow stamping, such as protective shells for mobile telephones, implementing this method for shells reinforced with continuous fibers having a deeper stamping, such as for luggage applications, remains of high cost.

Document EP 3 096 643 B1 describes a luggage element comprising two shells made of a polymer reinforced with polymer fibers. Said shells are obtained by assembling polymer matrix panels reinforced with polymer fibers, more particularly by assembling a bottom with side panels, in a thermocompression/overmolding operation. Thus, although each panel is individually reinforced with continuous polymer fibers, the shell obtained is not reinforced by a continuous reinforcement extending between two free edges of said shell.

OBJECT AND SUMMARY OF THE INVENTION

The invention aims to solve the drawbacks of the prior art and relates for this purpose to a method for manufacturing a quadrangular shell comprising five faces with flanged edges and non-developable trihedral couplings between the faces comprising the steps of:

i. cutting plies comprising continuous fibers, said fibers extending from one free edge to another free edge of the shell, the ply comprising cut-outs in such a way as to not cover the trihedral coupling zones;
ii. obtaining four consolidated coupling parts with the shape of said trihedral couplings, each part comprising an integration zone for the insertion thereof between the plies;
iii. positioning and laying up the plies obtained in step i);
iv. inserting the four consolidated parts into the trihedral coupling zones by inserting the integration zones between two plies to obtain a preform;
v. placing the preform in a tool and carrying out the consolidation of the fibrous plies layup by subjecting the assembly obtained in step iv) to a predetermined pressure—temperature cycle.

Thus, the fibrous plies only cover the developable zones and are installed in or on the tool easily, without creating any wrinkling. However, the composite part obtained is reinforced with continuous fibers extending from one free edge to another free edge of the shell, which ensures the rigidity and solidity of said shell.

The trunk corners are perfectly integrated after consolidation without an appearance defect.

The invention is implemented according to the embodiments and the variants set out hereinafter, which are to be considered individually or according to any technically operative combination.

According to an embodiment the coupling parts are made of a thermoplastic polymer and obtained by a plastic injection molding process. This production process is economical and reproducible in terms of the shape obtained.

Alternatively, the coupling parts are obtained by a thermocompression process.

Advantageously, the polymer making the coupling parts is reinforced with short fibers. Thus, the mechanical resistance of these parts is improved.

Advantageously, the polymer making the coupling parts is selected so that the maximum consolidation temperature applied to the assembly during step v) is greater than the glass transition temperature of said polymer but less than the melting temperature of said polymer. Thus, the shape of the trihedral coupling part adapts to the shape of the shell during the consolidation step.

According to an embodiment, the coupling parts extend between the flanged edges of the shaped shell. This embodiment makes it possible to simplify the cutting of the plies.

According to an embodiment step v) is carried out in a tool comprising a paired punch and die, the assembly obtained in step vi) being comprised between the punch and the die during step v).

According to another embodiment step v) comprises the tarping of the assembly obtained in step iv) with an impermeable tarpaulin and the vacuum evacuation of the space comprised between the tarpaulin and the tool.

BRIEF DESCRIPTION OF THE DRAWINGS

The invention is disclosed hereinafter according to its preferred embodiments, which are in no way limiting and in reference to FIGS. 1 to 6 wherein.

EMBODIMENTS OF THE INVENTION

Figure 1:
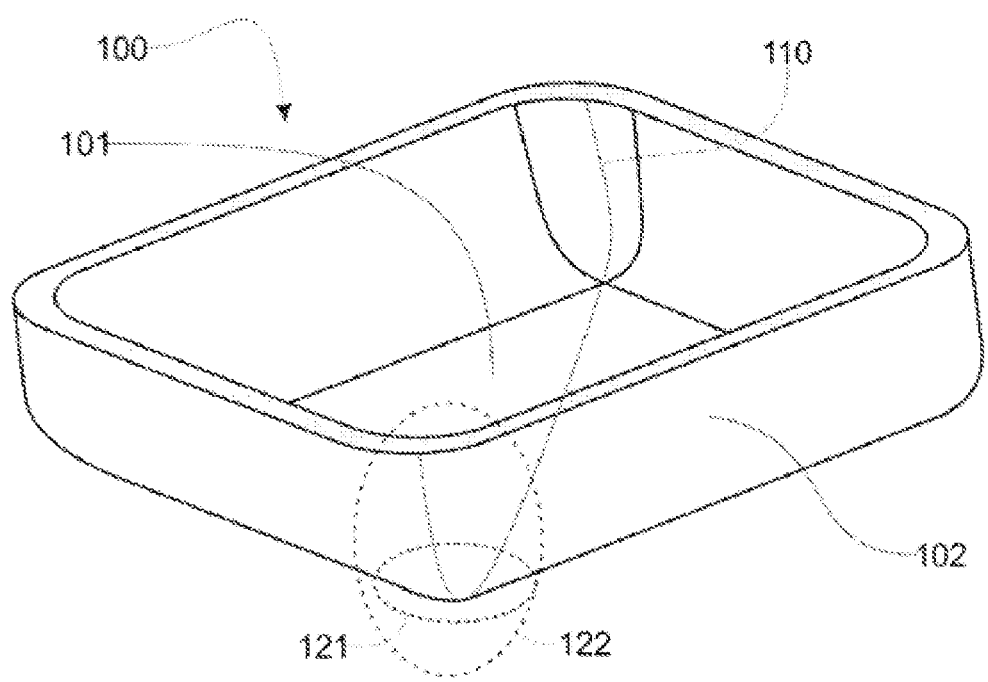
FIG. 1 shows, according to a perspective view, an example of a part that may be produced with the method of the invention.

According to an embodiment, the method and the device of the invention are implemented for the production of a quadrangular shell, similar to that of the prior art, made of a composite material comprising a thermoplastic polymer matrix reinforced with continuous fibers (290).

The invention is not however limited to this embodiment and can be implemented using plies pre-impregnated with a thermosetting polymer.

For this purpose, the preform is carried out by a lamination of fibrous plies (210, 220) comprising continuous fibers (290). At least one of said fibrous plies (210, 220) comprises continuous fibers (290) extending from a free edge (291) to another free edge (292) of the shell once said shell is produced according to the method of the invention.

By way of a non-limiting example, said fibrous plies comprise glass fibers, carbon fibers, natural fibers such as flax, bamboo or sisal fibers, or polymer fibers, in the form of a woven or non-woven fabric, coated with a thermoplastic polymer, co-mixed with a thermoplastic polymer or filmed with a thermoplastic polymer film.

Said fibrous plies are pre-cut in such a way that even the plies (210, 220) extending over the entire surface of the shell and covering the 5 faces of the latter, comprise cut-outs (221, 222) in such a way that they do not cover the coupling zones between the faces of the shell.

Figures 2A, 2B:
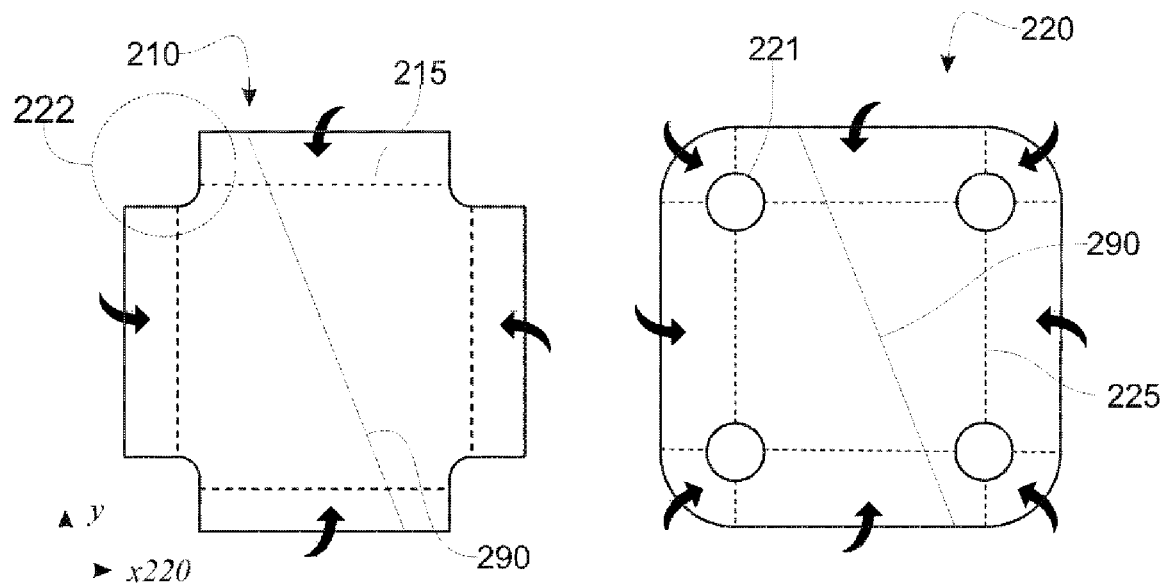
FIG. 2A shows as a top view an example of the cut out of plies for the manufacture of a part by the method of the invention.
FIG. 2B shows as a top view another example of the cut out of a plie for the manufacture of a shell according to the method of the invention.

FIG. 2A, according to an embodiment, the ply (210) comprises cut-outs (222) in such a way as to not cover the coupling zone between the flanged edges of the future shell that it covers, said cut-outs including the trihedral coupling zones.

FIG. 2B, according to another embodiment, the ply (220) includes a cut-out (221) at the trihedral coupling zones or trunk corners, between the faces that it covers.

These embodiments are not limiting. Thus, a result of the same degree is obtained, for example, by alternatingly laying up rectangular plies the large dimension of which extends along the Y axis with rectangular plies the large dimension of which extends according to the X axis, the latter in order to simplify the cut-outs.

FIG. 2B, the same principle applies for the configuration shown in this figure.

Regardless of the embodiment, the cut-outs (222, 221) are adapted to the shape of the coupling zone at the trunk corner of the final part, in particular at the coupling radii between the faces.

FIG. 2B, although the cut-outs (221) of the ply (220) are shown as circular cut-outs, the latter have an elliptical or even trilobal shape if the targeted couplings at the trunk corner on the final shell have a shape that is other than spherical.

Due to the presence of these cut-outs, the plies do not cover the non-developable zones of the finales part and the latter are easily applied on or in a tool with the shape of the part to be produced, by folding them according to the folding lines (215, 225) in such a way as to make the flanged edges.

Advantageously, the dimensions of the plies are variable according to their position in the stack in such a way as to take account of the variations in the coupling radii between the faces according to the thickness of the shell to be made.

The plies (210, 220) are laid up on a tool of the punch type, in relief, or of the die type, in hollow, to the shape of the shell to be produced.

According to the nature of the polymer making the matrix of the composite material the latter is present in the plie in the form of a coating, of a co-laminated film or comingled fibers, and according to the coupling radius between the faces of the shell, the folding of the plies is carried out by locally heating the ply in the folding zone, for example by means of a soldering iron or any other suitable means.

Advantageously, during the carrying out of the lamination, the plies are welded together by welding spots or welding lines in such a way to stabilize the assembly and facilitate the handling thereof.

Figure 3:
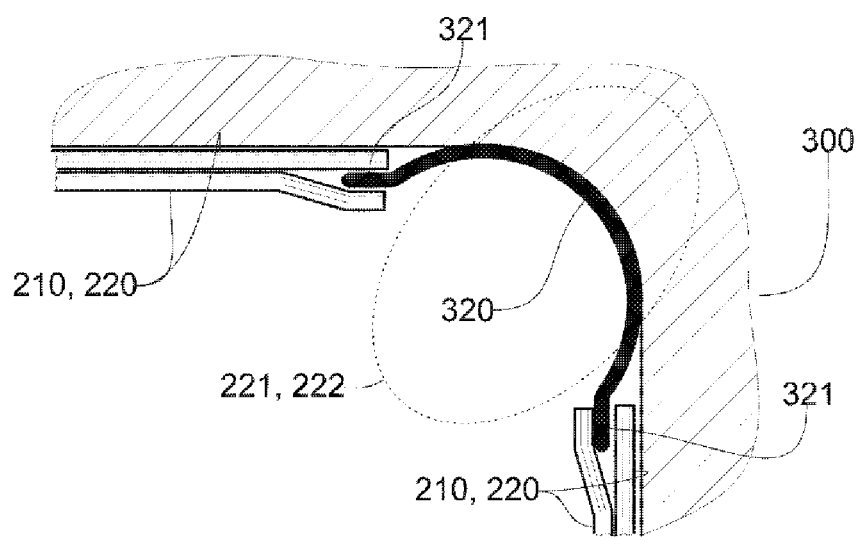
FIG. 3 shows according to a partial cross-section view, an example of the installation of a preform carried out by the method of the invention in a tool.

FIG. 3, the coupling between the plies (210, 220) in the coupling zones, corresponding to the cut-out zones (221, 222) of the plies is carried out by coupling parts (320) in the tool (300), here a die comprising an imprint with the shape of the shell.

Said coupling parts (320) are shaped like the coupling surface in said coupling zones between the faces of the shell and comprise an anchoring portion (321) adapted to be integrated between the plies (210, 220) on the edges of the cutting zones (221, 222).

Figure 4:
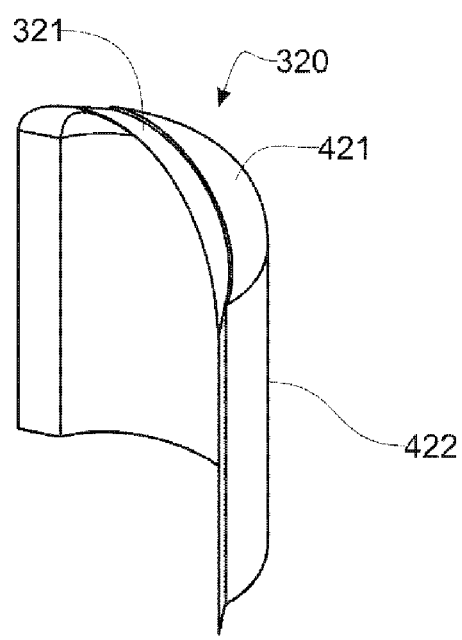
FIG. 4 shows, according to a perspective view, an embodiment of a coupling part for the implementation of the method of the invention.

FIG. 4, according to an embodiment the coupling part (320) comprises 2 separate portions (421, 422) which are separate or integral with each other. One (421) of these two portions corresponds to the trihedral coupling zone, and the other (422), to the coupling zone that is substantially developable between the faces.

The anchoring portion (321) is shown here as simple, but according to embodiments comprises reliefs to perfect its grip between the plies.

According to an embodiment (not shown) said coupling parts comprises arrangements for the installation of a casing supporting caster wheels or for the passage of the arms of a telescopic handle.

The coupling parts are of any nature, in particular made from plastic, metal or composite material.

Said coupling parts are obtained by implementing a method adapted to their nature, and are carried out independently of the shell, in such a way that they can be produced in mass production in a manufacturing unit remote from the manufacturing unit of the shells.

According to an advantageous embodiment, the coupling parts are constituted of a thermoplastic polymer and are obtained by a method of plastic injection molding or by thermocompression.

According to an alternative of this embodiment, the coupling parts are made of a thermoplastic polymer reinforced with short fibers.

According to an advantageous embodiment, the melting temperature of the polymer making the coupling parts is greater than the melting temperature (in the case of a thermoplastic polymer) or than the curing temperature (in the case of a thermosetting polymer) of the polymer impregnating the plies making the remainder of the shell.

Advantageously, the glass transition temperature of the polymer constituting the coupling part is less than the melting temperature or than the curing temperature of the polymer impregnating the plies making the remainder the shell. Thus, during the consolidation or the curing of the assembly, the coupling parts have a certain plasticity that allows for an adaptation of their shape to the mold.

Figure 5:
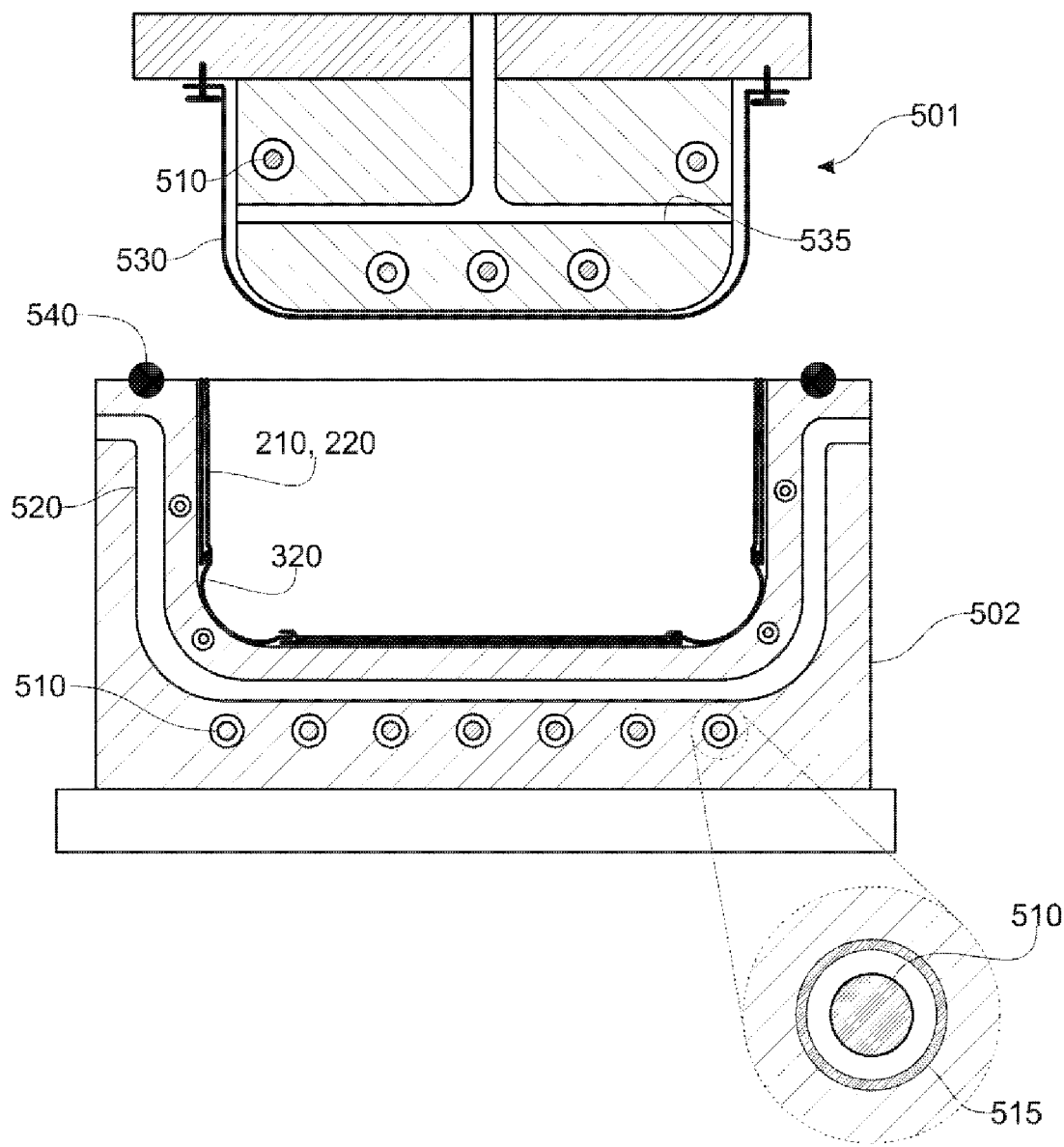
FIG. 5 shows, according to a cross-section view, an example of a tool for the implementation of the method of the invention.

FIG. 5, according to a first embodiment, the consolidation of the assembly, comprising the lamination and the coupling parts, is carried out in a mold comprising a punch (501) and a die (502) which are paired.

The punch and the die are installed, one on the platen, the other on a mobile portion of a press.

The punch and/or the die advantageously comprise a heating network comprising inductors (510) extending in cavities made respectively in the punch and in the die and distributed so as to obtain a uniform heating temperature of the preform, when said inductors are supplied with and alternating current at a frequency comprised between 10 kHz and 100 kHz.

The spatial distribution of the inductors in the die or in the punch is obtained, for example, by means of thermal simulations implementing finite element calculations.

The punch and/or the die are preferably made of a material having good thermal conductivity and a high thermal effusivity, such as an aluminum alloy or a copper alloy.

This characteristic favors a rapid heating and a rapid transmission of the heat from the mold to the preform, but also participates in the obtaining of a uniformity in temperature on the surfaces of the punch or of the die in contact with the preform during consolidation.

FIG. 5, as shown in the detailed view, the walls of the cavities comprise a layer (515) made of a material sensitive to heating by induction, such as a ferromagnetic steel or a nickel alloy without these examples being a limitation.

The thickness of this layer (515) is about one millimeter.

According to an embodiment the layer (515) of material sensitive to heating by induction does not cover the entire surface of the cavity, but only the portion of the section of the cavity oriented towards the surface of the mold in contact with the preform.

This characteristic makes it possible to orient the heating towards the preform and to obtain a uniform distribution of the heating temperature of the latter without heating the entire mass of the mold.

According to another embodiment the mold is entirely made from a steel that is ferromagnetic at the desired forming temperature.

When the inductors (510) are supplies with alternating current, the layer (515) sensitive to induction heating rises in temperature and transmits its heat to the die or to the punch, which conveys this heat to the preform.

The mold also comprises cooling means (520) in the form of ducts wherein a heat-transfer fluid such as water, oil or a gas, circulates.

Said cooling circuit makes it possible to quickly cool the mold and the consolidated preform thereby reducing the duration of the manufacturing cycles.

According to an embodiment, the punch (501) comprises an inflatable bladder (530) and means (535) for inflating said bladder.

The mold further comprises means (540) for providing sealing between the punch (501) and the die (502) when the mold is closed, i.e. when the punch is brought closer to the die by means of the press.

Thus, when the mold is closed, the preform is comprised in a sealed cavity delimited between the punch (501) and the die (502).

According to an embodiment more specifically adapted to the case where the plies (210, 220) comprise a thermoplastic polymer, the preform integrating the coupling parts (320) is placed in the die (502) or on the punch (501).

Beforehand, the preform is assembled by assembling the plies (210, 220) and the coupling parts (320), or directly in one of the tools of the mold, punch or die, or on a separate tooling.

In case of plies pre-impregnated with a thermoplastic polymer, the plies are held together, as well as with the coupling parts, by welding sports or welding lines.

This preliminary assembly of the preform is carried out manually or by a robot.

The die is brought closer to the punch so as to create a sealed cavity wherein said preform is comprised.

According to an embodiment, said cavity is evacuated to vacuum by suitable means (not shown).

In parallel, the inductors (510) are powered by an alternating current which has the effect of heating the preform to a temperature at least equal to the melting temperature of the thermoplastic polymer impregnating the plies.

According to their constitution, the coupling parts (320) retain their integrity at this temperature, but advantageously, according to an embodiment, when said coupling parts are made of an injection molded polymer or formed by thermocompression, the glass transition temperature of the polymer making the coupling parts (320) is less than the melting temperature of the polymer impregnating the plies.

An additional pressure is applied on the preform by moving the punch towards the die and/or by inflating the bladder (530) of the punch.

The application of this pressure makes it possible to calibrate the final thickness of the part and to ensure a uniform distribution of the polymer in its thickness.

The coupling parts (320), when they are made of a polymer, being relatively malleable, when this additional pressure is applied, said pression makes them to conform the shape of the mold and thus ensures an aesthetically perfect coupling between the plies and said coupling parts.

The electrical power supply of the inductors is stopped, and the heat-transfer fluid is sent into the ducts (520), in such so as to cool the mold and the preform, while still maintaining the pressure on said preform.

When the temperature of the preform is less than the glass transition temperature of the polymer impregnating the plies, the mold can be opened and the part removed from the mold.

The cycle then continues with a new preform.

The use of induction heating and forced cooling allows the cycle to be completed in less than 5 minutes.

Figure 6:
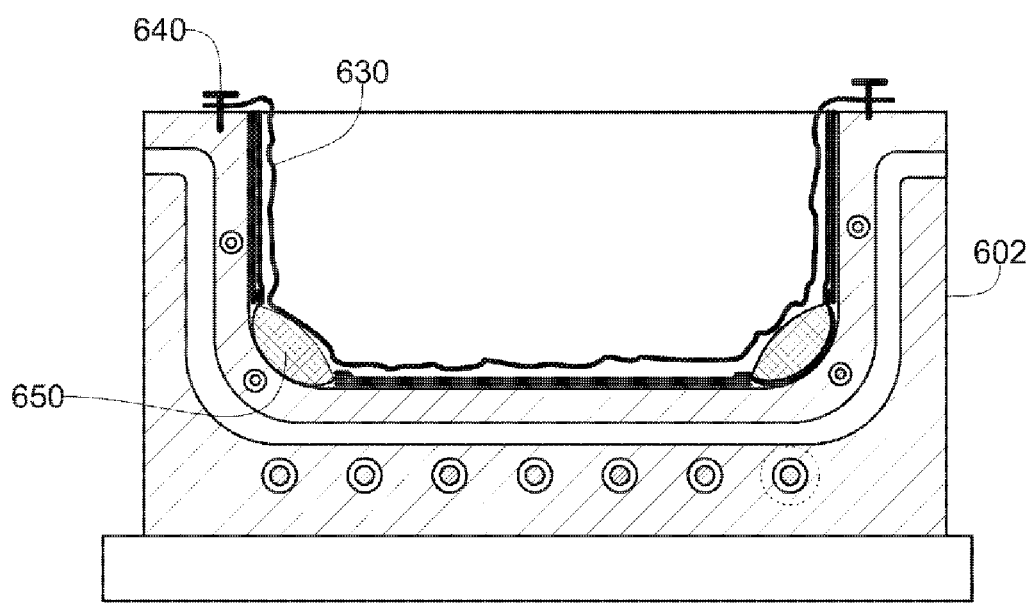
FIG. 6 shows, according to a cross-section view, another example of a tool for the implementation of the method of the invention.

FIG. 6, according to an exemplary embodiment, the tool for implementing the method of the invention comprises a shape, male or female (602), on which or wherein the preform comprising the coupling parts is installed, a tarpaulin (630) and means (640) for sealing the space between said tarpaulin (630) and the tool (602).

The preform being installed in or on the tool, is thus contained in a sealed cavity between said tool and the tarpaulin (630).

This embodiment is better adapted, but not exclusively, to the case where the plies of the preform are impregnated with a thermosetting polymer.

As in the preceding embodiment, the tool comprises induction heating means and cooling means.

Means (not shown) make it possible to vacuum evacuate the space comprised between the tarpaulin (630) and the walls of the tool (602), wherein the preform is located.

Intermediate parts (650) made of a compressible material, are placed between the tarpaulin (630) and the preform at coupling parts.

Thus, the preform having non-developable zones, more particularly in the coupling zones, the formation of wrinkles in the tarpaulin (630) is confined to these non-developable zones where it does not affect the quality of the final part, by the presence of coupling parts and of intermediate parts (650). This characteristic also makes it possible to reduce the manufacturing cost of the tarpaulin (630).

According to this embodiment, the preform being placed on or in the tool, and the tarpaulin being installed, the space between the tarpaulin and the tool and wherein the preform is located in vacuum evacuated, at the same time as the inductors are powered with alternating current to bring the preform to the curing temperature (or melting temperature in the case of a thermoplastic polymer) of the polymer impregnating the plies of the preform.

The tarpaulin provides a uniform pressure over all the plies of the preform.

The pressure and the temperature are maintained during the curing cycle, then the cooling means are used to cool the mold and the part thus produced, before breaking the vacuum and removing said part from the mold.

FIG. 5, those skilled in the art will understand that the tool shown can also be used for the curing of a preform comprising plies impregnated with a thermosetting polymer.

FIG. 6, those skilled in the art will likewise understand that the tool shown can also be used for the consolidation of a preform comprising plies impregnated with a thermoplastic polymer.

The description hereinabove and the embodiments show that the invention achieves the intended purpose and makes it possible on the basis of fibrous plies pre-impregnated with a thermoplastic or thermosetting polymer, to obtain a composite part reinforced with continuous fibers in the form of a quadrangular shell having a deep stamp without having resorting to complex draping or stamping techniques.

The method of the invention is thus adapted to the obtaining such parts in mass production for common consumption goods such as luggage products.

The invention claimed is:

1. A method for manufacturing a quadrangular shell comprising five faces with flanged edges and non-developable trihedral couplings between the faces comprising:
    i. cutting plies comprising continuous fibers, the continuous fibers extending from a free edge to another free edge of the quadrangular shell, the plies comprising cut-outs so as to not cover trihedral coupling zones;
    ii. obtaining four consolidated coupling parts with a shape of the non-developable trihedral couplings, each consolidated coupling part comprising an integration zone for insertion thereof between the plies;
    iii. positioning and laying up the plies obtained in the step i);
    iv. inserting the four consolidated coupling parts into the trihedral coupling zones by inserting the integration zones between two plies to form an assembly to obtain a preform; and
    v. placing the preform in a tool and carrying out consolidation of lamination of fibrous plies by subjecting an assembly obtained in the step iv) to a predetermined pressure and temperature cycle.

2. The method of claim 1, wherein the four consolidated coupling parts are made of a thermoplastic polymer.

3. The method of claim 2, wherein the thermoplastic polymer of the four consolidated coupling parts is reinforced with short fibers.

4. The method of claim 1, wherein the four consolidated coupling parts are obtained by plastic injection molding.

5. The method of claim 1, wherein the four consolidated coupling parts are obtained by a method of thermocompression.

6. The method of claim 2, wherein the thermoplastic polymer of the four consolidated coupling parts is selected so that a maximum consolidation temperature applied to the assembly during the step v) is greater than a glass transition temperature of the thermoplastic polymer but less than a melting temperature of the thermoplastic polymer.

7. The method of claim 1, wherein the four consolidated coupling parts extend between flanged edges of the shaped shell.

8. The method of claim 1, wherein the tool comprises a punch and a die, which are paired, and the assembly being comprised between the punch and the die during the step v).

9. The method of claim 1, wherein the step v) comprises tarping of the assembly by an impermeable tarpaulin and vacuum evacuation of space comprised between the tarpaulin and the tool.

10. A shell configured to a luggage element obtained by the method of claim 1, comprising trihedral coupling parts including arrangements for installation of a castor wheel casing or passing of arms of a telescopic handle.

* * * * *